United States Patent [19]

Teranaka et al.

[11] Patent Number: 4,482,677
[45] Date of Patent: Nov. 13, 1984

[54] PROCESS FOR PRODUCING HIGH IMPACT POLYSTYRENE

[75] Inventors: Osamu Teranaka; Tsutomu Kakutani; Haruro Tabata; Tutomu Teraoka, all of Oita, Japan

[73] Assignee: Japan Elastomer Co., Ltd., Tokyo, Japan

[21] Appl. No.: 290,338

[22] Filed: Aug. 5, 1981

[30] Foreign Application Priority Data

Aug. 25, 1980 [JP] Japan ................. 55-115845

[51] Int. Cl.$^3$ ........................................... C08F 279/02
[52] U.S. Cl. .................................... 525/250; 525/316
[58] Field of Search ................. 525/250, 316; 526/173, 526/175

[56] References Cited

U.S. PATENT DOCUMENTS

| 3,177,190 | 4/1965 | Hsieh | 526/175 |
| 3,264,375 | 8/1966 | Jones | 525/316 |
| 3,280,084 | 10/1966 | Zelinski | 525/316 |
| 3,644,322 | 2/1972 | Farrar | 526/173 |
| 3,957,913 | 5/1976 | Roest et al. | 260/880 B |
| 4,004,070 | 1/1977 | Farrar | 526/175 |
| 4,340,691 | 7/1982 | Lal | 525/250 |

FOREIGN PATENT DOCUMENTS 1223079 2/1971 United Kingdom .
1289783 9/1972 United Kingdom .

OTHER PUBLICATIONS

R. P. Zelinski and C. F. Wofford, "Synthesis of Trichain and Tetrachain Radial Polybutadienes," 1965, vol. 3, pp. 93–103, *Journal of Polymer Science: Part A.*

Primary Examiner—Paul R. Michl
Attorney, Agent, or Firm—Birch, Stewart, Kolasch & Birch

[57] ABSTRACT

A process for producing a high impact polystyrene characterized by polymerizing a conjugated diene (preferably, 1,3-butadiene) by the use of an organolithium-based catalyst containing a polyfunctional organolithium compound (preferably, said organolithium-based cataylst is a mixture of a polyfunctional organolithium compound and a monofunctional organolithium compound at such a mixing ratio that the amount of lithium atom in the polyfunctional organolithium compound is 5% by weight or more based on the total sum of the lithium atoms in the respective compounds), coupling the resulting polymer molecules with a polyfunctional treating agent having at least two (preferably, 2–4 on the average) reactive sites capable of reacting with the active lithium terminal of the polymer, dissolving in styrene the conjugated diene polymer thus obtained, which has substantially a network structure and is substantially soluble in styrene, preferably in a proportion of 2–30% by weight, and then radical-polymerizing the resulting solution by bulk polymerization or bulk-suspension polymerization.

17 Claims, No Drawings

PROCESS FOR PRODUCING HIGH IMPACT POLYSTYRENE

This invention relates to a process for producing a high impact polystyrene excellent in stiffness and excellent in Izod impact strength at room and low temperatures.

Although a polystyrene resin is widely used in various fields because of its superiority in stiffness, transparency, gloss, etc. and its excellent moldability, the serious fault thereof is that the impact resistance is low. For eliminating such a fault, there is known a method by which a rubbery polymer is mechanically blended with polystyrene, and a method by which a solution of a rubbery polymer in styrene is subjected to bulk polymerization or bulk-suspension polymerization. Among them, the method by which bulk polymerization or bulk-suspension polymerization is conducted is extensively carried out industrially because the resulting polymer is excellent in physical properties. The rubbery polymer used as a toughening agent in these methods includes, for example, butadiene rubber, styrene-butadiene rubber and the like, among which the butadiene rubber is extensively used because it imparts an excellent impact resistance to the product.

Recently, high impact polystyrene has become used in housings of domestic electric instruments, their parts, parts of vehicles, parts of business machines, daily necessaries, sundry goods, toys, etc., so that various, more satisfactory characteristics have become required. Among the characteristics, high stiffness and excellent impact resistance are most fundamental physical properties and the improvement thereof is intensely required.

As is well known, the impact resistance can be improved by increasing the content of rubbery polymer. However, a styrene solution of rubber at a high concentration has so high a viscosity that inconveniences arise at the time of commercial production, at the time of transportation and at the time of stirring. In addition, the impact resistance of a high impact polystyrene containing an increased amount of a rubbery polymer is improved, but its stiffness markedly decreases and it becomes a soft and weak resin.

On the other hand, the stiffness can be improved by decreasing the content of rubbery polymer or by making finer the rubber particles to be dispersed in the resin. On the other side, this brings about a marked decrease in impact resistance.

As mentioned above, impact resistance and stiffness are mutually contradictory, so that it has been difficult to obtain a high impact polystyrene having simultaneously a high stiffness and an excellent impact resistance.

Under the above-mentioned circumstances, the present inventors have conducted extensive research on obtaining a high impact polystyrene having an improved impact resistance, particularly an increased Izod impact strength at both room temperature and low temperatures, and also having an improved stiffness, without increasing the content of rubbery polymer. As a result, the above-mentioned object has been achieved on the basis of a conception and a knowledge entirely different from those in the prior art.

For example, it is generally said that it is more desirable for the rubbery polymer used as the toughening agent to have a lower transition temperature (Tg) for obtaining an excellent impact strength at low temperatures (for example, in Japanese Patent Application Kokai (Laid-Open) No. 46,691/73). In the case of conjugated diene polymers, the Tg varies depending upon their microstructure. For example, it has been considered that the higher the cis-1,4 content, the lower the Tg of polybutadiene, and also the lower the 1,2-vinyl content, the lower the Tg of polybutadiene, and accordingly that a high impact polystyrene in which a polybutadiene having a high cis-1,4 content and a low 1,2-vinyl content is used as the toughening agent is excellent in impact strength at low temperatures. However, the present inventors have found that the impact strength at low temperatures, particularly Izod impact strength at low temperatures, can be improved, and the Izod impact strength at room temperature can also be improved to a great extent and, in addition, a product having a high stiffness can be obtained, by using as a toughening agent the specific rubber obtained according to the process of the invention, even if the Tg of the resulting conjugated diene polymer is the same or, in other words, the microstructure of the polymer is the same.

Further, regarding impact resistance, another interesting fact has been found. That is, though the impact resistance of a high impact polystyrene is usually evaluated and judged by measuring the Izod impact strength and the failling weight impact strength, it has been surprisingly found as a result of the study of the present inventors contrary to the general expectation that, even if conjugated diene polymers having the same Tg, namely having the same micro-structure, are used as a toughening agent, the high impact polystyrenes obtained therefrom range from those having an excellent falling weight impact strength to those having an excellent Izod impact strength depending upon the method of polymerization for obtaining the conjugated diene polymer. In addition, the high impact polystyrenes having an excellent falling weight impact strength obtained do not always have an excellent Izod impact strength. Particularly, it has been found that a product having an excellent stiffness and an excellent Izod impact strength at room temperature and low temperatures can be obtained by using as a toughening agent a conjugated diene polymer obtained by the specific polymerization process.

According to this invention, there is provided a process for producing a high impact polystyrene, characterized by polymerizing a conjugated diene by the use of an organolithium-based catalyst containing a polyfunctional organolithium compound, then coupling the resulting polymer molecules with a polyfunctional treating agent having at least two reactive sites capable of reacting with the active lithium terminal of the polymer, dissolving in styrene the conjugated diene polymer thus obtained having substantially a network structure and being substantially soluble in styrene, and radical-polymerizing the resulting solution by bulk polymerization or bulk-suspension polymerization.

Since in the high impact polystyrene of this invention a conjugated diene polymer having a specific branched structure obtained by polymerizing a conjugated diene by the use of an organolithium-based catalyst containing a polyfunctional organolithium compound and then coupling the resulting polymer molecules with a polyfunctional treating agent is used as a toughening agent, it is superior in Izod impact strengths at room and low temperatures and in stiffness to high impact polystyrenes using conventional conjugated diene polymers even if they have the same micro-structure, in other words, even if they have the same Tg. This finding conquers the hitherto accepted common knowledge and is epoch-making. Further, the conjugated diene polymer obtained by the specific polymerization process employed in this invention has a branched structure, and hence, has a low cold flow during storage and is low in solution viscosity when dissolved in styrene. Therefore, said solution causes no inconveniences at the time of commercial production of polystyrene, at the time of storage, at the time of stirring, or at the time of transportation.

The conjugated diene used in this invention is a conjugated diene having 4–12 carbon atoms per one molecule, including, for example, 1,3-butadiene, isoprene, 2,3-dimethyl-1,3-butadiene, piperylene, 1,3-octadiene, 4,5-diethyl-1,3-octadiene and the like, among which 1,3-butadiene is particularly preferred. The conjugated diene polymer used in this invention is a polymer of at least one of said conjugated dienes and includes homopolymers of said conjugated dienes and copolymers of two or more of the conjugated dienes. Preferable conjugated diene polymers are polybutadiene, polyisoprene and butadiene-isoprene copolymer, among which polybutadiene is most preferable.

The conjugated diene polymer used in this invention, obtained by the specific polymerization process, is a polymer obtained by solution-polymerizing a conjugated diene with an organolithium-based catalyst containing a polyfunctional organolithium compound as a polymerization initiator.

The organolithium-based catalyst containing a polyfunctional organolithium compound herein referred to means a substantially polyfunctional organolithium compound, and there may be used any of the hitherto known organolithium compound catalysts so far as they have such a polyfunctionality that the polymers coupled with the polyfunctional treating agent are substantially soluble in styrene. It may also be a mixture of a polyfunctional organolithium compound and a monofunctional organolithium compound. However, a conjugated diene polymer which is obtained by polymerizing a conjugated diene with a certain kind of organolithium compound having a high degree of polyfunctionality and then coupling the resulting polymer molecules with a treating agent having a high degree of polyfunctionality, and has a high extent of network structure, but is insoluble in styrene, is outside the scope of this invention. Whether the conjugated diene polymer is substantially soluble in styrene or it is insoluble therein depends on the polyfunctionality of the organolithium-based catalyst used as well as on polyfunctionality and amount of the polyfunctional treating agent used. Those conjugated diene polymers which are substantially soluble in styrene are within the scope of this invention.

The term "polyfunctional lithium compound" used herein means those having at least two anion-polymerizable lithium atoms. On the other hand, the term "monofunctional organolithium compound" means those having one anion-polymerizable lithium atom.

Said polyfunctional organolithium compounds are preferably dilithiomethane, 1,4-dilithiobutane, 1,6-dilithiohexane, 1,4-dilithiocyclohexene, 1,4-dilithio-2-ethylcyclohexane, 1,3-dilithio-4-phenylbutane, 1,2-dilithio-1,2-diphenylethane, 1,10-dilithiodecane, 1,20-dilithioeicosane, 1,1-dilithiodiphenylene, 1,4-dilithiobenzene, 1,5-dilithionaphthalene, dilithiopolybutadiene, dilithioisoprene, dilithiodiisoprene, dilithiopolyisoprene, 2,2′,2″-trilithio-p-terphenyl, 1,3,5-trilithiobenzene, 1,3,5-trilithio-2,4,6-triethylbenzene and the like.

On the other hand, said monofunctional organolithium compound preferably include n-propyllithium, isopropyllithium, n-butyllithium, sec-butyllithium, t-butyllithium, n-pentyllithium, lithium-toluene, benzyllithium and the like.

As the organolithium-based catalyst of this invention, mixtures of polyfunctional organolithium compound and monofunctional organolithium compound are often used. The mixing ratio between the polyfunctional organolithium compound and the monofunctional organolithium compound should be so selected that the amount of lithium atom in the polyfunctional organolithium compound is 5% by weight or more based on the total sum of the lithium atoms in the respective compounds. If it is less than 5% by weight, the effect of improving the stiffness and Izod imapct strengths at room and low temperatures of the obtained high impact polystyrene is small.

As the organolithium-based catalyst containing polyfunctional organolithium compound used in this invention, in addition to those mentioned above, a reaction product of a monofunctional organolithium compound with another compound which can be used substantially as an organolithium-based catalyst containing a polyfunctional organolithium compound is also within the scope of this invention. Among the examples of such catalysts, particularly typical are the reaction products between at least two members comprising a monofunctional organolithium compound and a polyvinyl aromatic compound. They are most excellent as a catalyst for obtaining a conjugated diene polymer by the specific polymerization process employed in this invention. For example, there are preferably used in this invention a reaction product of a monofunctional organolithium compound and a polyvinyl aromatic compound (Japanese Patent Application Kokai (Laid-Open) No. 103,690/73), a reaction product obtained by reacting a monofunctional organolithium compound and a conjugated diene or a monovinyl aromatic compound and then reacting a polyvinyl aromatic compound therewith, or a reaction product obtained by simultaneously reacting a monofunctional organolithium compound, a conjugated diene or a monovinyl aromatic compound and a polyvinyl aromatic compound (West German Pat. No. 2,003,384), and the like.

Further, as shown in Japanese Patent Publication No. 37,078/75, a catalyst can be obtained by reacting a polyvinyl aromatic compound with a reaction product of a monofunctional organolithium compound and a monovinyl aromatic compound and then reacting a monovinyl aromatic compound therewith, which is also effective in this invention.

The polyvinyl aromatic compound referred to herein includes divinylbenzene, 1,2,4-trivinylbenzene, 1,3-divinylnaphthalene, 1,3,5-trivinylnaphthalene, 2,4-divinylbiphenyl, 3,5,4-trivinylbiphenyl and the like, among which divinylbenzene is particularly preferable. Divinylbenzene has o-, m- and p-isomers, and the commercially available divinylbenzene is a mixture of these isomers. Such commercially available divinylbenzene is practically satisfactory. Said monovinyl aromatic compound includes styrene, vinyltoluene, vinylethylbenzene, vinylxylene, vinylnaphthalene and the like, among which styrene is particularly preferred.

However, it is quite difficult to quantitatively grasp the polyfunctionality of the polyfunctional catalyst which is a reaction product of at least two members comprising a monofunctional organolithium compound and a polyvinyl aromatic compound. Accordingly, at the present stage, 1,3-butadiene is polymerized with the polyfunctional catalyst obtained in the above-mentioned manner and the Mooney viscosity of the resultant rubbery polymer is employed as a measure for the polyfunctionality, or 1,3-butadiene is polymerized and then styrene is polymerized with the polyfunctional catalyst obtained in the above-mentioned manner and the green strength of the resultant block copolymer is employed as a measure for the polyfunctionality. In this invention, however, the molar ratio of polyvinyl aromatic compound to monofunctional organolithium compound is preferably 0.1:1 or more. If it is smaller than 0.1:1, the effect of improving the stiffness and the effect of improving the Izod impact strength are both small. On the other hand, when the molar ratio of the polyvinyl aromatic compound to the monofunctional organolithium compound is greater than 0.1:1, the polyfunctional catalyst obtained sometimes forms a gel and becomes insoluble in the polymerization solvent, or the finally obtained conjugated diene polymer sometimes becomes substantially insoluble in styrene, with an increase in the molar ratio. Nevertheless, the polyfunctional catalyst thus obtained is in the scope of this invention, so far as it is substantially soluble in the polymerization solvent and the finally obtained conjugated diene polymer is substantially soluble in styrene.

In the conjugated diene polymer produced by the specific polymerization process employed in this invention, the use of an organolithium-based catalyst containing a polyfunctional organolithium compound and the coupling of the resulting polymer molecules with a polyfunctional treating agent having at least two reactive sites capable of reacting with the active terminals of the resulting polymer are important requirements. This is because the conjugated diene polymer in the process of this invention becomes a polymer having substantially a network structure and being substantially soluble in styrene owing to the use of the specific organolithium-based catalyst and the specific polyfunctional treating agent. The use of this conjugated diene polymer having substantially a network structure is an important requirement in this invention.

Accordingly, in both the case where the conjugated diene polymer has been obtained by merely polymerizing a conjugated diene with an organolithium-based catalyst containing a polyfunctional organolithium compound (that is, it is not coupled with a polyfunctional treating agent) and the case where it has been obtained by polymerizing a conjugated diene with a mere monofunctional organolithium compound and then coupling the resulting polymer molecules with a polyfunctional treating agent (that is, the organolithium-based catalyst containing polyfunctional organolithium compound is not used), a polymer having a network structure is not obtained, so that the high impact polystyrene obtained therefrom cannot be so improved in stiffness and Izod impact strength at room and low temperatures as in this invention.

In the polyfunctional treating agent in this invention, it is sufficient that at least two reactive sites are contained, and the agent may also be a mixture of compounds having 2 or more reactive sites. However, those having 2-4 reactive sites on the average are preferable. If a polyfunctional treating agent having unnecessarily many reactive sites is used, the Mooney viscosity of the conjugated diene polymer formed increases and the polymer becomes insoluble in styrene, so that it is outside the scope of this invention.

As said polyfunctional treating agent, there may be used well known ones including the silane compounds shown in J. Polymer Sci., A-1, 3, 93 (1965) such as trimethylchlorosilane, dimethyldichlorosilane, silicon tetrachloride and the like and the diesters shown in British Pat. No. 1,223,079 such as diethyl adipate and the like.

The amount of said polyfunctional treating agent used varies depending on the polyfunctionality of the organolithium-based catalyst used and the polyfunctionality of the polyfunctional treating agent used, and said treating agent is used in an amount falling in a range sufficient to make the resulting polymer substantially soluble in styrene. In general, however, a conjugated diene is polymerized by the use of an organolithium-based catalyst, and the resulting polymer having a lithium terminal is then reacted with 0.1-2 equivalents, based on its lithium, of the above-mentioned treating agent. If the amount of the treating agent is less than 0.1 equivalent or more than 2 equivalents based on the lithium of the polymer having a lithium terminal, the effect of improving the stiffness and Izod impact strength at room and low temperatures of the obtained high impact polystyrene is small.

In the process of this invention, the microstructure, particularly the vinyl content, of the conjugated diene polymer affects somewhat the Izod impact strength of the high impact polystyrene obtained therefrom. For example, in the case of the polybutadiene of this invention, an extremely high 1,2-vinyl content causes a decrease in Izod impact strength. In general, therefore, butadiene should be polymerized so as to give a 1,2-vinyl content of 35% or less by the use of a 1,2-vinyl content regulator.

The regulation of 1,2-vinyl content may be effected by any of the hitherto known methods. Concretely, it can be achieved when producing the conjugated diene polymer of this invention by adding an ether such as dimethyl ether, diethyl ether, tetrahydrofuran or the like, an amine such as diemthylamine or the like or a thioether such as dimethyl sulfide, diethyl sulfide or the like to the polymerization system as a 1,2-vinyl content regulator and carrying out the polymerization in the presence thereof. Furthermore, there may be used a method by which hexamethylphosphoramide (HMPA) is added (Canadian Patent No. 823,300), a method by which tetramethylethylenediamine (TMEDA) is added (British Pat. No. 1,051,269), a method by which diethylene glycol dimethyl ether is added, and other methods. The polymerization may be carried out either in such a manner that the 1,2-vinyl content becomes uniform throughout the molecular chain, or may be conducted so that the 1,2-vinyl content is gradually reduced along the molecular chain as stated in Japanese Patent Publication No. 875/73, or so that the 1,2-vinyl configurations are bonded in the block form (U.S. Pat. No. 3,301,840).

The conjugated diene polymer obtained by the specific process which polymer is the toughening agent of this invention is usually dissolved in styrene in a proportion of 2-30% by weight and the resulting solution is used for the production of a high impact polystyrene. If the amount of the polymer dissolved is less than 2% by weight, there is observed substantially no effect of improving the impact resistance of polystyrene. On the other hand, the upper limit of the amount of the polymer dissolved is determined depending on the solution viscosity attained by dissolving the conjugated diene polymer in styrene. If the solution viscosity is too high, the polymerization for obtaining a high impact polystyrene becomes practically impossible in respect of stirring, heat removal, and the like. In the case of the conjugated diene polymer obtained by the specific process of this invention, the upper limit of said amount is 30% by weight. The conjugated diene polymers obtained by the specific process falling in the scope of this invention may be used in admixture of two or more, and may also be used in combination with a small quantity of other rubbers such as solution-polymerized SBR, emulsion-polymerized SBR, polybutadienes produced by other processes, and the like.

As the actual process for the production of the high impact polystyrene of this invention, bulk polymerization or bulk-suspension polymerization is advantageously employed in industry.

In general, in bulk polymerization, the conjugated diene polymer obtained by the specific process of this invention is dissolved in styrene, and in the case of using no catalyst it is polymerized usually at 95°–200° C., while in the case of catalytic polymerization or irradiation polymerization the polymerization operation is continued usually at a lower temperature or a temperature of 20°–150° C. until the polymerization of styrene is substantially completed. In the bulk polymerization, a known internal lubricant such as liquid paraffin is often added in a proportion of 1–5 parts by weight per 100 parts by weight of polymer. After completion of the polymerization, if the resulting polymer contains a small quantity (1–5%) of unreacted styrene, the unreacted styrene is preferably removed by a known method, for example, by removal under reduced pressure or by means of an extruder designed for the purpose of removing volatile components, or the like. Although the stirring is, if necessary, carried out in the course of bulk polymerization, it is desirable to stop or relax the stirring after the conversion of styrene into a polymer has reached 30% or more, because an excessive stirring can sometimes lower the strength of polymer obtained. If necessary, the polymerization may be effected in the presence of a small quantity of a diluent such as toluene, ethylbenzene or the like and then the diluent may be removed, together with unreacted styrene, by heating after completion of the polymerization.

Bulk-suspension polymerization is also useful for the production of the high impact polystyrene of this invention. According to this process, the former half of the reaction is carried out in the bulk state and its latter half is carried out in the suspension state. That is, a solution in styrene of the specific conjugated diene polymer obtained by the process of this invention is heat-polymerized in the absence of a catalyst or polymerized in the presence of a catalyst or irradiation-polymerized in the same manner as in the above-mentioned bulk polymerization to partially polymerize usually not more than 50%, preferably 10–40%, of the styrene. This is the bulk polymerization in the former half stage. Subsequently, the partially polymerized mixture is dispersed in an aqueous medium with stirring in the presence of a suspension stabilizer alone or in combination with a surfactant and the latter half of the reaction is completed by suspension polymerization. Finally, the polymerization product is washed, dried, optionally pelletized or pulverized, and then put to practical use.

In addition to the above methods, a useful high impact polystyrene can also be obtained by hitherto known processes which are modifications or improvements of the above-mentioned methods. Moreover, a part of the styrene for forming the high impact polystyrene together with the conjugated diene polymer obtained by the specific process of this invention may be replaced by a monomer other than styrene which monomer is radically copolymerizable with styrene. Said copolymerizable monomer other than styrene is used in an amount of 50% by weight or less based on the total monomer including styrene. As said copolymerizable monomer other than styrene, one or more monomers selected from monovinyl aromatic hydrocarbons such as α-methylstyrene, vinyltoluene, vinylethylbenzene, vinylxylene, vinylnaphthalene and the like; conjugated dienes such as butadiene, isoprene and the like; acrylonitrile; methyl methacrylate; and the like are used.

As compared with the hitherto known high impact polystyrenes composed of styrene or composed mainly of styrene, the high impact polystyrene of this invention thus obtained is quite excellent in both the Izod impact strength at room and low temperatures, sufficient in stiffness, and excellent in productivity. Therefore, the industrial significance of this invention is very great.

The high impact polystyrene of this invention can be formed into a variety of practically useful articles by a molding method such as injection molding, extrusion molding or the like. Further, in the above molding, there may be, if necessary, blended therewith an antioxidant, an ultraviolet absorber, a lubricant, a releasing agent, a filler and the like, as well as other thermoplastic resins such as general purpose polystyrene, methacrylate resin and the like.

This invention will be explained below more concretely with reference to Examples which are not by way of limitation but by way of illustration.

EXAMPLE 1

Polybutadienes of Experiments A, B, C and D were prepared according to the recipes shown in Table 1.

In Experiment A, an autoclave having an inner capacity of 10 liters and equipped with a stirring device and a jacket was washed, dried and purged with nitrogen, to which 100 parts by weight of previously purified and dried butadiene and 700 parts by weight of n-hexane were added. As a catalyst, a 5% by weight solution of 0.18 part by weight of an organolithium-based catalyst in n-hexane was added, said organolithium-based catalyst being a mixture of 1,2-dilithio-1,2-diphenylethane and n-butyllithium having a lithium atom ratio of 1:4 based on the total lithium atoms in the respective compounds. Then, polymerization was carried out at 70° C. for 2 hours. Then, 0.043 part by weight of silicon tetrachloride was added, as a polyfunctional treating agent, to the resulting polymer and the resulting mixture was subjected to reaction for one hour. To the resulting polymer solution was added 0.5 part by weight of 2,6-di-tert-butyl-4-methylphenol (BHT) as a stabilizer, and the solvent was remvoed by heating to obtain a polybutadiene. Experiment B was a case in which the polymerization was carried out by the use of n-butyllithium without using the polyfunctional treating agent. Experiment C was a case in which the polymerization was carried out with 1,2-dilithio-1,2-diphenylethane without using the polyfunctional treating agent. Experiment D was a case in which the polymerization was carried out with n-butyllithium and the coupling with the polyfunctional treating agent was effected.

Characteristic properties of the polybutadienes thus obtained are shown in Table 1. Mooney viscosities are expressed by $ML_{1+4}(100° C.)$. The viscosities of 5% by weight solutions in styrene were measured at 25° C. by means of Cannon-Fenske viscometer. The micro-structures were measured by Morero's method [La Chimica E L'industria, 41, 758 (1959)] by means of an infrared spectrophotometer.

Using the rubbers shown in Table 1, high impact polystyrenes were produced by the bulk polymerization mentioned below.

A mixture of 6 parts by weight of the rubber of Table 1, 94 parts by weight of styrene, 8 parts by weight of toluene and 0.5 part by weight of 2,6-di-tert-butyl-4-methylphenol was stirred at room temperature to dissolve the rubber. The solution was transferred to a reactor, and polymerization was carried out by elevating the temperature from 100° C. to 130° C. in 4 hours with stirring, then elevating the temperature from 130° C. to 150° C. in 6 hours with stirring and finally elevating the temperature from 150° C. to 180° C. in 2 hours. The temperature was then elevated to 230° C. and the unreacted matter was removed under vacuum, after which the polymer was pulverized and pelletized by means of an extruder.

The polymer thus obtained was compression molded. According to JIS K 6871, the Izod impact strength and tensile strength of the polymer were measured, and the flexural modulus of the polymer was measured in order to evaluate the stiffness. The results are shown in Table 1.

It is apparent from Table 1 that the sample of Experiment A is excellent in Izod impact strength at room and low temperatures and is excellent in stiffness.

TABLE 1

|  | Experiment A | Experiment B | Experiment C | Experiment D |
|---|---|---|---|---|
| Recipe for rubber preparation* | | | | |
| Butadiene | 100 | 100 | 100 | 100 |
| n-Butyllithium | 0.13 | 0.06 | — | 0.09 |
| 1,2-Dilithio-1,2-diphenylethane | 0.05 | — | 0.18 | — |
| (Lithium atom ratio in catalyst**) | (0.2) | (—) | (—) | (—) |
| n-Hexane | 700 | 700 | 700 | 700 |
| Silicon tetrachloride | 0.043 | — | — | 0.024 |
| (Equivalent ratio to catalyst) | (0.4) | (—) | (—) | (0.4) |
| BHT | 0.5 | 0.5 | 0.5 | 0.5 |
| Fundamental characteristics of rubber | | | | |
| Mooney viscosity ($ML_{1+4}(100° C.)$) | 60 | 62 | 61 | 59 |
| Viscosity of 5 wt. % solution | 80 | 170 | 165 | 130 |
| Micro-structure, Vinyl (%) | 14.5 | 14.2 | 14.8 | 14.1 |
| Characteristics of high impact polystyrene | | | | |
| Stress at yield (kg/cm$^2$) | 305 | 260 | 265 | 265 |
| Elongation (%) | 25 | 23 | 23 | 25 |
| Izod impact strength (notched, kg-cm/cm) | | | | |
| 20° C. | 8.5 | 6.3 | 6.5 | 7.0 |
| −25° C. | 5.1 | 3.0 | 2.9 | 3.6 |
| Flexural modulus (kg/cm$^2$) | 25,500 | 21,000 | 21,500 | 22,000 |

Note:
*The unit is part by weight.
** Lithium atoms in dilithium compound / Total lithium atoms

EXAMPLE 2

Various polybutadienes were prepared by carrying out polymerization according to the recipes shown in Table 2 at a varying mixing ratio between the dilithium compound and the monolithium compound in the organolithium-based catalyst. The concrete procedure of the polymerization was the same as in Example 1. Thus, polybutadienes of Experiments E, F and G were obtained.

Using these three kinds of polybutadienes, bulk polymerization was carried out in the same manner as in Example 1 to obtain high impact polystyrenes having a rubber content of 6% by weight, the evaluation of which was carried out by the same method as in Example 1. It is apparent from Table 2 that the samples of Experiments E and F in which the proportion of the lithium atom of 1,2-dilithio-1,2-diphenylethane to the total lithium atoms of 1,2-dilithio-1,2-diphenylethane and n-butyllithium is in the range of this invention are superior to the sample of Experiment G in which the proportion of the lithium atom of 1,2-dilithio-1,2-diphenylethane is out of the range of this invention in respect of Izod impact strength at room and low temperatures and stiffness.

TABLE 2

|  | Experiment E | Experiment A | Experiment F | Experiment G |
|---|---|---|---|---|
| Recipe for rubber preparation* | | | | |
| Butadiene | 100 | 100 | 100 | 100 |
| n-Butyllithium | 0.12 | 0.13 | 0.11 | 0.10 |
| 1,2-Dilithio-1,2-diphenylethane | 0.12 | 0.05 | 0.02 | 0.005 |
| (Lithium atom ratio in catalyst**) | (0.4) | (0.2) | (0.1) | (0.03) |
| n-Hexane | 700 | 700 | 700 | 700 |
| Silicon tetrachloride | 0.053 | 0.043 | 0.033 | 0.027 |
| (Equivalent ratio to catalyst) | (0.4) | (0.4) | (0.4) | (0.04) |
| BHT | 0.5 | 0.5 | 0.5 | 0.5 |

TABLE 2-continued

|  | Experiment E | Experiment A | Experiment F | Experiment G |
|---|---|---|---|---|
| Fundamental characteristics of rubber | | | | |
| Mooney viscosity ($ML_{1+4}(100°$ C.)) | 65 | 60 | 61 | 60 |
| Viscosity of 5 wt. % solution in styrene (cps, 25° C.) | 70 | 80 | 100 | 115 |
| Micro-structure, Vinyl (%) | 14.3 | 14.5 | 14.7 | 14.4 |
| Characteristics of high impact polystyrene | | | | |
| Stress at yield (kg/cm$^2$) | 320 | 305 | 295 | 270 |
| Elongation (%) | 22 | 25 | 25 | 26 |
| Izod impact strength (notched, kg-cm/cm) | | | | |
| 20° C. | 9.0 | 8.5 | 8.5 | 7.4 |
| −25° C. | 4.9 | 5.1 | 4.8 | 3.9 |
| Flexural modulus (kg/cm$^2$) | 26,300 | 25,500 | 24,800 | 23,000 |

Note:
*The unit is part by weight.
** $\frac{\text{Lithium atoms in dilithium compound}}{\text{Total lithium atoms}}$

EXAMPLE 3

The polyisoprenes of Experiments H and I were prepared according to the recipes shown in Table 3. Polymerization was carried out by repeating the procedure of Experiment A, except that 1,2-dilithio-1,2-diphenylethane only was used as the organolithium-based catalyst and diethyl adipate was used as the polyfunctional treating agent. The rubber of Experiment I was prepared without using the polyfunctional treating agent. The rubber of Experiment H was soluble in styrene. The fundamental characteristics of the rubbers are shown in Table 3.

Using these rubbers, high impact polystyrenes having a rubber content of 8% by weight were prepared by carrying out bulk polymerization in the same manner as in Exmaple 1. The results are shown in Table 3. It is apparent from Table 3 that the sample of Experiment H is superior to the sample of Experiment I in respect of Izod impact strength at room and low temperatures and stiffness.

TABLE 3

|  | Experiment H | Experiment I |
|---|---|---|
| Recipe for rubber preparation* | | |
| Isoprene | 100 | 100 |
| 1,2-Dilithio-1,2-diphenylethane | 0.24 | 0.16 |
| n-Hexane | 700 | 700 |
| Diethyl adipate | 0.025 | — |
| (Equivalent ratio to catalyst) | (0.2) | (—) |
| BHT | 0.5 | 0.5 |
| Fundamental characteristics of rubber | | |
| Mooney viscosity ($ML_{1+4}(100°$ C.)) | 55 | 52 |
| Viscosity of 5 wt. % solution in styrene (cps, 25° C.) | 95 | 160 |
| Characteristics of high impact polystyrene | | |
| Stress at yield (kg/cm$^2$) | 270 | 230 |
| Elongation (%) | 42 | 48 |
| Izod impact strength (notched, kg-cm/cm) | | |
| 20° C. | 7.8 | 5.9 |
| −25° C. | 4.5 | 2.4 |
| Flexural modulus (kg/cm$^2$) | 23,000 | 19,000 |

Note:
*The unit is part by weight.

EXAMPLE 4

Various polybutadienes different in 1,2-vinyl content were prepared according to the Recipes shown in Table 4. Polymerization was carried out by repeating the procedure of Example 1, except that methyltrichlorosilane was used as the polyfunctional treating agent and tetrahydrofuran was used as the 1,2-vinyl content regulator. The fundamental characteristics of the polybutadienes are shown in Table 4. Using these rubbers, high impact polystyretes were prepared by the bulk-suspension polymerization mentioned below.

To 94 parts by weight of styrene was added 6 parts by weight of polybutadiene, and the latter was dissolved in the former at room temperature with stirring, and to the resulting solution was then added 0.06 part by weight of tert-dodecylmercaptan. The resulting solution was heated at 120° C. for 5 hours with stirring. When about 35% by weight of the styrene had been polymerized, 0.3 part by weight of tris-nonylphenyl phosphite and 0.1 part by weight of di-tert-butyl peroxide were added per 100 parts by weight of said solution.

On the other hand, 0.15 part by weight of polyvinyl alcohol as a suspension stabilizer and 0.05 part by weight of sodium dodecylbenzenesulfonate as a surfactant were dissolved in 100 parts by weight of water. In this solution was suspended 100 parts by weight of the above-mentioned partially polymerized product. With stirring, this suspended mixture was heated at 120° C. for 4 hours, then at 130° C. for 2 hours and finally at 150° C. for 2 hours to substantially complete the polymerization of styrene. Thus, a high impact polystyrene in the form of suspended particles was obtained. The polystyrene was separated from the reaction mixture by centrifugation, washed with hot water and air-dried.

The properties of the high impact polystyrenes obtained in this manner are shown in Table 4.

It is apparent from Table 4 that the Izod impact strength decreases with an increase of 1,2-vinyl content.

TABLE 4

|  | Experiment J | Experiment K | Experiment L | Experiment M |
|---|---|---|---|---|
| Recipe for rubber preparation* | | | | |
| Butadiene | 100 | 100 | 100 | 100 |

TABLE 4-continued

|  | Experiment J | Experiment K | Experiment L | Experiment M |
|---|---|---|---|---|
| n-Butyllithium | 0.120 | 0.116 | 0.112 | 0.108 |
| 1,2-Dilithio-1,2-diphenylethane | 0.045 | 0.044 | 0.042 | 0.041 |
| (lithium atom ratio of catalyst)** | 0.2 | 0.2 | 0.2 | 0.2 |
| Tetrahydrofuran | 0 | 0.25 | 1.2 | 3.0 |
| n-Hexane | 700 | 700 | 700 | 700 |
| Methyltrichlorosilane | 0.082 | 0.079 | 0.076 | 0.074 |
| (Equivalent ratio to catalyst) | (0.7) | (0.7) | (0.7) | (0.7) |
| BHT | 0.5 | 0.5 | 0.5 | 0.5 |
| Fundamental characteristics of rubber | | | | |
| Mooney viscosity ($ML_{1+4}(100°$ C.)) | 89 | 90 | 92 | 88 |
| Viscosity of 5 wt. % solution in styrene (cps, 25° C.) | 120 | 115 | 105 | 95 |
| Micro-structure, Vinyl (%) | 14.8 | 21 | 32 | 40 |
| Characteristics of high impact polystyrene | | | | |
| Stress at yield (kg/cm$^2$) | 315 | 302 | 288 | 275 |
| Elongation (%) | 24 | 29 | 31 | 35 |
| Izod impact strength (notched, kg-cm/cm) | | | | |
| 20° C. | 8.7 | 8.1 | 7.6 | 7.0 |
| −25° C. | 5.2 | 4.8 | 4.4 | 3.7 |
| Flexural modulus (kg/cm$^2$) | 26,000 | 25,300 | 24,200 | 23,000 |

Note:
*) 
**) The same as in Table 1.

EXAMPLE 5

An organolithium-based catalyst, which was a reaction product between at least two members comprising a monofunctional organolithium compound and a polyvinyl aromatic compound, was prepared. With this catalyst, various polybutadienes used in this invention were prepared.

The process for preparing said organolithium-based catalyst is shown in Table 5-1. As the divinylbenzene, a commercially available dividnylbenzene was used. It was a mixture comprising 57% of divinylbenzene isomers and the balance of ethylvinylbenzene and diethylbenzene.

The catalysts prepared by the process fo Table 5-1 were all soluble in n-hexane which was the solvent in the subsequent polymerization of butadiene.

With the catalysts prepared by the method shown in Table 5-1, butadiene was polymerized by the same procedure as in Example 1 to obtain the results shown in Table 5-2, provided that the sample of Experiment R was not used in the subsequent preparation of high impact polystyrene because it formed a gel after the coupling with the polyfunctional treating agent.

Then, using the above-mentioned various polybutadienes, high impact polystyrenes having a rubber content of 10% by weight were prepared by the same procedure as in Example 1, and their properties were measured. The results obtained are shown in Table 5-2.

It is apparent from Table 5-2 that Experiment N wherein the molar ratio of divinylbenzene to n-butyllithium is 0.05 is smaller than the other experiments in the improving effect, with regard to both stiffness and Izod impact strength.

TABLE 5-1

|  | Experiment N | Experiment O | Experiment P | Experiment Q | Experiment R |
|---|---|---|---|---|---|
| Recipe (part by wt.) | | | | | |
| Divinylbenzene | 0.65 | 1.95 | 3.90 | 3.90 | 6.50 |
| n-Butyllithium | 6.40 | 6.40 | 6.40 | 6.40 | 6.40 |
| DVB/NBL (molar ratio)* | 0.05 | 0.15 | 0.30 | 0.30 | 0.50 |
| Butadiene | — | — | 24 | — | — |
| Toluene | 480 | 480 | 480 | 480 | 480 |
| Reaction conditions | | | | | |
| Temperature (°C.) | 70 | 70 | 70 | 70 | 70 |
| Time (minute) | 40 | 40 | 40 | 40 | 40 |
| Gel in reaction product | None | None | None | None | None |

Note:
*Divinylbenzene/n-Butyllithium (molar ratio)

TABLE 5-2

|  | Experiment N | Experiment O | Experiment P | Experiment Q | Experiment R |
|---|---|---|---|---|---|
| Recipe for rubber preparation* | | | | | |
| Butadiene | 100 | 100 | 100 | 100 | 100 |
| Prepared catalyst | 0.07 | 0.14 | 0.25 | 0.25 | 0.29 |
| (DVB/NBL molar ratio)** | (0.05) | (0.15) | (0.30) | (0.30) | (0.50) |
| n-Hexane | 700 | 700 | 700 | 700 | 700 |
| Silicon tetrachloride | 0.07 | 0.14 | 0.25 | 0.25 | 0.29 |
| (Equivalent ratio to catalyst) | (1.5) | (1.5) | (1.5) | (1.5) | (1.5) |
| BHT | 0.5 | 0.5 | 0.5 | 0.5 | 0.5 |
| Fundamental characteristics of rubber | | | | | |
| Mooney viscosity ($ML_{1+4}(100°$ C.)) | 85 | 87 | 88 | 86 | 89 |
| Viscosity of 5 wt. % solution in styrene (cps, 25° C.) | 140 | 115 | 50 | 50 | Gelation |
| Micro-structure, Vinyl (%) | 14.2 | 14.5 | 14.1 | 14.8 | |
| Characteristics of high impact | | | | | |

TABLE 5-2-continued

|  | Experiment N | Experiment O | Experiment P | Experiment Q | Experiment R |
|---|---|---|---|---|---|
| polystyrene |  |  |  |  |  |
| Stress at yield (kg/cm²) | 215 | 237 | 261 | 280 |  |
| Elongation (%) | 46 | 1 42 | 40 | 45 |  |
| Izod impact strength (notched, kg-cm/cm) |  |  |  |  |  |
| 20° C. | 9.1 | 10.8 | 11.5 | 12.3 |  |
| −25° C. | 5.6 | 7.4 | 8.2 | 8.3 |  |
| Flexural modulus (kg/cm²) | 18,000 | 19,700 | 21,200 | 22,000 |  |

Note:
*The unit is part by weight.
**The same as in Table 5-1.

What is claimed is:

1. A process for producing a high impact polystyrene, characterized by polymerizing a conjugated diene by the use of an organolithium-based catalyst containing a polyfunctional organolithium compound, then coupling the resulting polymer molecules with a polyfunctional treating agent having at least two reactive sites capable of reacting with the active lithium terminal of the polymer, the amount of said polyfunctional treating agent being 0.1-2 equivalents based on the lithium in the lithium-terminated polymer obtained by polymerizing said conjugated diene with said organolithium-based catalyst, dissolving in styrene the conjugated diene polymer thus obtained having substantially a network structure and substantially soluble in styrene, and radical-polymerizing the resulting solution by bulk polymerization or bulk-suspension polymerization.

2. A process according to claim 1, wherein said organolithium-based catalyst is a mixture of a polyfunctional organolithium compound and a monofunctional organolithium compound and the ratio between these two compounds satisfies the requirement that the amount of lithium atom in the polyfunctional organolithium compound is 5% by weight or more based on the total sum of lithium atoms in the respective compounds.

3. A process according to claim 1, wherein said organolithium-based catalyst is a reaction product between at least two members of monofunctional organolithium compound and polyvinyl aromatic compound.

4. A process according to claim 3, wherein the molar ratio of said polyvinyl aromatic compound to said monofunctional organolithium compound is 0.1:1 or more.

5. A process according to claim 3 or 4, wherein said polyvinyl aromatic compound is divinylbenzene, 1,2,4-trivinylbenzene, 1,3-divinylnaphthalene, 1,3,5-trivinylnaphthalene, 2,4-divinylbiphenyl or 3,4,5-trivinylbiphenyl.

6. A process according to claim 3 or 4, wherein said polyvinyl aromatic compound is divinylbenzene.

7. A process according to claim 1, 2 or 3, wherein said conjugated diene has 4-12 carbon atoms.

8. A process according to claim 1, 2 or 3, wherein said conjugated diene is 1,3-butadiene, isoprene, 2,3-dimethyl-1,3-butadiene, piperylene, 1,3-octadiene or 4,5-diethyl-1,3-octadiene.

9. A process according to claim 1, 2 or 3, wherein said conjugated diene is 1,3-butadiene.

10. A process according to claim 1 or 2, wherein said polyfunctional organolithium compound is dilithiomethane, 1,4-dilithiobutane, 1,6-dilithiohexane, 1,4-dilithiocyclohexene, 1,4-dilithio-2-ethylcyclohexane, 1,3-dilithio-4-phenylbutane, 1,2-dilithio-1,2-diphenylethane, 1,10-dilithiodecane, 1,20-dilithioeicosane, 1,1-dilithiodiphenylene, 1,4-dilithiobenzene, 1,5-dilithionaphthalene, dilithiopolybutadiene, dilithioisoprene, dilithiodiisoprene, dilithiopolyisoprene, 2,2',2''-trilithio-p-terphenyl, 1,3,5-trilithiobenzene, or 1,3,5-trilithio-2,4,6-triethylbenzene.

11. A process according to claim 1 or 2, wherein said polyfunctional compound is 1,2-dilithio-1,2-diphenylethane.

12. A process according to claim 1, wherein a 1,2-vinyl content regulator is allowed to coexist at the time of polymerizing said conjugated diene.

13. A process according to claim 12, wherein said 1,2-vinyl content regulator is dimethyl ether, diethyl ether, tetrahydrofuran, dimethylamine, dimethyl sulfide or diethyl sulfide.

14. A process according to claim 12, wherein said 1,2-vinyl content regualtor is tetrahydrofuran.

15. A process according to claim 12, 13 or 14, wherein said conjugated diene is 1,3-butadiene and the resulting polybutadiene has a 1,2-vinyl content of 35% or less.

16. A process according to claim 1, wherein the number of reactive sites, capable of reacting with active lithium terminal, in said polyfunctional treating agent is 2-4 on the average.

17. A process according to claim 1, wherein said conjugated diene polymer is dissolved in a proportion of 2-30% by weight in styrene.

* * * * *